US012746909B2

(12) United States Patent
Imamura et al.

(10) Patent No.: US 12,746,909 B2
(45) Date of Patent: Sep. 29, 2026

(54) BATTERY ELECTRIC VEHICLE

(71) Applicant: TOYOTA JIDOSHA KABUSHIKI KAISHA, Toyota (JP)

(72) Inventors: Tatsuya Imamura, Okazaki (JP); Yoichiro Isami, Mishima (JP); Taro Moteki, Zama (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 107 days.

(21) Appl. No.: 18/903,692

(22) Filed: Oct. 1, 2024

(65) Prior Publication Data

US 2025/0145146 A1 May 8, 2025

(30) Foreign Application Priority Data

Nov. 8, 2023 (JP) ................................ 2023-190754

(51) Int. Cl.
*B60W 20/30* (2016.01)
*B60W 10/08* (2006.01)

(52) U.S. Cl.
CPC ............ *B60W 20/30* (2013.01); *B60W 10/08* (2013.01); *B60W 2510/1005* (2013.01); *B60W 2540/10* (2013.01); *B60W 2710/083* (2013.01)

(58) Field of Classification Search
CPC ................. B60W 20/30; B60W 10/08; B60W 2510/1005; B60W 2540/10; B60W 2710/083; B60W 30/188; B60W 2540/16; B60L 2240/16; B60L 2240/421; B60L 2240/423; B60L 2240/461; B60L 2240/486; B60L 2240/80; B60L 2250/24; B60L 2250/26; B60L 2260/30; B60L 2260/44;
(Continued)

(56) References Cited

U.S. PATENT DOCUMENTS

| | | | | |
|---|---|---|---|---|
| 6,740,002 B1 * | 5/2004 | Stridsberg | ............. | B60K 6/387 903/910 |
| 8,504,229 B2 * | 8/2013 | Sandstrom | ............. | B60W 10/11 701/22 |

(Continued)

FOREIGN PATENT DOCUMENTS

| | | |
|---|---|---|
| JP | 2011-215436 A | 10/2011 |
| JP | 6787507 B1 | 11/2020 |

(Continued)

*Primary Examiner* — Mussa A Shaawat
(74) *Attorney, Agent, or Firm* — Finnegan, Henderson, Farabow, Garrett, and Dunner, LLP

(57) ABSTRACT

A battery electric vehicle includes: an electric motor configured to serve as a driving source for the battery electric vehicle; a driving operation member configured to be used to drive the battery electric vehicle; a pseudo shifting operation member that imitates an operation member configured to be used to perform a shifting operation of a manual transmission internal combustion engine vehicle; a transmission mounted between the electric motor and a drive wheel and configured to allow a driver to manually switch between a gear ratio for normal use and a low-speed gear ratio; and a control device configured to control a motion of the battery electric vehicle in response to an operation of the driving operation member according to an operation state of the pseudo shifting operation member and a gear ratio selected by the transmission.

6 Claims, 8 Drawing Sheets

(58) Field of Classification Search
CPC . B60L 2270/145; B60L 15/20; B60Y 2200/91
See application file for complete search history.

(56) References Cited

U.S. PATENT DOCUMENTS

| | | | | |
|---|---|---|---|---|
| 9,457,794 | B2 * | 10/2016 | Shimoyama | F02N 11/08 |
| 9,802,509 | B2 * | 10/2017 | Matsushima | B60L 50/16 |
| 10,017,174 | B2 * | 7/2018 | Wang | B60W 20/15 |
| 10,525,972 | B2 * | 1/2020 | Inoue | F16D 48/062 |
| 10,583,838 | B2 * | 3/2020 | Chang | B60W 10/02 |
| 10,981,561 | B2 * | 4/2021 | Suh | B60W 20/20 |
| 12,227,167 | B2 * | 2/2025 | Kostarigka | B60W 10/11 |
| 12,263,831 | B2 * | 4/2025 | Imamura | B60L 15/2054 |
| 2005/0230975 | A1 * | 10/2005 | Yang | B60W 20/00<br>290/4 R |
| 2005/0230976 | A1 * | 10/2005 | Yang | B60K 6/442<br>290/4 R |
| 2007/0037661 | A1 * | 2/2007 | Yang | B60K 6/42<br>477/115 |
| 2011/0202222 | A1 * | 8/2011 | Yamamoto | B60W 20/00<br>180/65.265 |
| 2014/0336858 | A1 * | 11/2014 | Matsushima | B62M 11/06<br>701/22 |
| 2015/0057866 | A1 * | 2/2015 | Tseng | B60W 30/19<br>701/22 |
| 2015/0166048 | A1 * | 6/2015 | Herrmann | B60W 20/30<br>180/65.265 |
| 2017/0232951 | A1 * | 8/2017 | Nawata | B60W 20/40<br>180/65.265 |
| 2018/0079416 | A1 * | 3/2018 | Damman | B60W 10/026 |
| 2018/0105159 | A1 * | 4/2018 | Park | B60K 6/442 |
| 2018/0148043 | A1 * | 5/2018 | Hokoi | B60W 30/18127 |
| 2018/0354499 | A1 * | 12/2018 | Park | B60W 20/50 |
| 2019/0126759 | A1 * | 5/2019 | Miller | B60L 7/18 |
| 2019/0193720 | A1 * | 6/2019 | Komuro | B60K 6/543 |
| 2020/0263785 | A1 * | 8/2020 | Perez | B60K 20/08 |
| 2021/0053487 | A1 * | 2/2021 | Vangelov | B60G 17/018 |
| 2021/0107456 | A1 * | 4/2021 | Kim | B60K 17/354 |
| 2021/0229550 | A1 * | 7/2021 | Isami | B60L 15/2054 |
| 2021/0387529 | A1 * | 12/2021 | Oh | B60L 15/20 |
| 2021/0387531 | A1 * | 12/2021 | Oh | B60L 15/20 |
| 2022/0041064 | A1 * | 2/2022 | Nishimine | B60L 15/20 |
| 2022/0041065 | A1 * | 2/2022 | Isami | B60K 23/00 |
| 2022/0041066 | A1 * | 2/2022 | Isami | B60K 23/02 |
| 2023/0234589 | A1 | 7/2023 | Kanzaki et al. | |

FOREIGN PATENT DOCUMENTS

| | | | |
|---|---|---|---|
| JP | 2022-030840 | A | 2/2022 |
| JP | 2022-034648 | A | 3/2022 |
| JP | 2023-051313 | A | 4/2023 |
| JP | 2023-107412 | A | 8/2023 |

* cited by examiner

BATTERY ELECTRIC VEHICLE

CROSS-REFERENCE TO RELATED APPLICATION

This application claims priority to Japanese Patent Application No. 2023-190754 filed on Nov. 8, 2023, incorporated herein by reference in its entirety.

BACKGROUND

1. Technical Field

The present disclosure relates to battery electric vehicles including an electric motor as a driving source.

2. Description of Related Art

Japanese Patent No. 6787507 (JP 6787507 B) and Japanese Unexamined Patent Application Publication No. 2022-030840 (JP 2022-030840 A) disclose a technique related to a battery electric vehicle that can simulate manual shifting operations of a vehicle with a manual transmission powered by an internal combustion engine (hereinafter referred to as "manual transmission internal combustion engine vehicle") by controlling an electric motor.

SUMMARY

The above technique allows to experience operating a manual transmission internal combustion engine vehicle while driving a battery electric vehicle. However, since the manual transmission operated in the above technique is merely virtual, the driving force of the battery electric vehicle can only be changed within a range determined by the maximum torque of the electric motor and the reduction ratio from the electric motor to drive wheels. Therefore, the driving force may not be large enough in situations that require a large driving force, which may reduce drivability.

The present disclosure reduces a decrease in drivability of a battery electric vehicle including an electric motor as a driving source due to the driving force being not large enough in situations that require a large driving force.

A battery electric vehicle according to one aspect of the present disclosure includes: an electric motor configured to serve as a driving source for the battery electric vehicle; a driving operation member configured to be used to drive the battery electric vehicle; a pseudo shifting operation member that imitates an operation member configured to be used to perform a shifting operation of a manual transmission internal combustion engine vehicle; a transmission mounted between the electric motor and a drive wheel; and a control device. The transmission is configured to allow a driver to manually switch between a gear ratio for normal use and a low-speed gear ratio. The control device is configured to control a motion of the battery electric vehicle in response to an operation of the driving operation member according to an operation state of the pseudo shifting operation member and a gear ratio selected by the transmission. For example, the transmission may be a transfer case configured to select from four-wheel drive low gear, four-wheel drive high gear, and two-wheel drive high gear.

According to the one aspect of the present disclosure, the driving operation member may include an accelerator pedal, and the pseudo shifting operation member may include a pseudo shifter imitating a shifter of a manual transmission. The control device may be configured to change torque of the electric motor according to an amount of operation of the accelerator pedal, a shift position selected by operating the pseudo shifter, and the gear ratio selected by the transmission. The pseudo shifter may be configured to select from a plurality of shift positions that is assigned different virtual gear ratios. The virtual gear ratios may be set in such a manner that none of combinations of the virtual gear ratio and the gear ratio selected by the transmission have a same overall gear ratio, the overall gear ratio being obtained by multiplying the virtual gear ratio by the gear ratio of the transmission.

According to another aspect of the present disclosure, the driving operation member may include an accelerator pedal, and the pseudo shifting operation member may include a pseudo shifter imitating a shifter of a manual transmission, and a pseudo clutch operation device imitating a clutch operation device. The control device may be configured to change torque of the electric motor according to an amount of operation of the accelerator pedal, a shift position selected by operating the pseudo shifter, an amount of operation of the pseudo clutch operation device, and the gear ratio selected by the transmission. The pseudo shifter may be configured to select from a plurality of shift positions that is assigned different virtual gear ratios. The virtual gear ratios may be set in such a manner that none of combinations of the virtual gear ratio and the gear ratio selected by the transmission have a same overall gear ratio, the overall gear ratio being obtained by multiplying the virtual gear ratio by the gear ratio of the transmission.

According to the other aspect of the present disclosure, the battery electric vehicle may further include a sound generator configured to artificially generate a sound in a vehicle cabin. The sound generator may be configured to perform either or both of the following: increasing a sound pressure of the sound as the amount of operation of the pseudo clutch operation device increases, and increasing a frequency of the sound as the amount of operation of the pseudo clutch operation device increases.

According to the battery electric vehicle of the present disclosure, the driver can drive the battery electric vehicle as if it were a manual transmission internal combustion engine vehicle by operating the driving operation member and the pseudo shifting operation member. By manually operating the transmission to switch the gear ratio from the gear ratio for normal use to the low-speed gear ratio, the driver can cause the battery electric vehicle to generate a larger driving force than during driving in gear for normal use. The above configuration can reduce a decrease in drivability due to the driving force being not large enough in situations that require a large driving force.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. First Embodiment 1-1. Configuration of Power System of Vehicle

Figure 1:
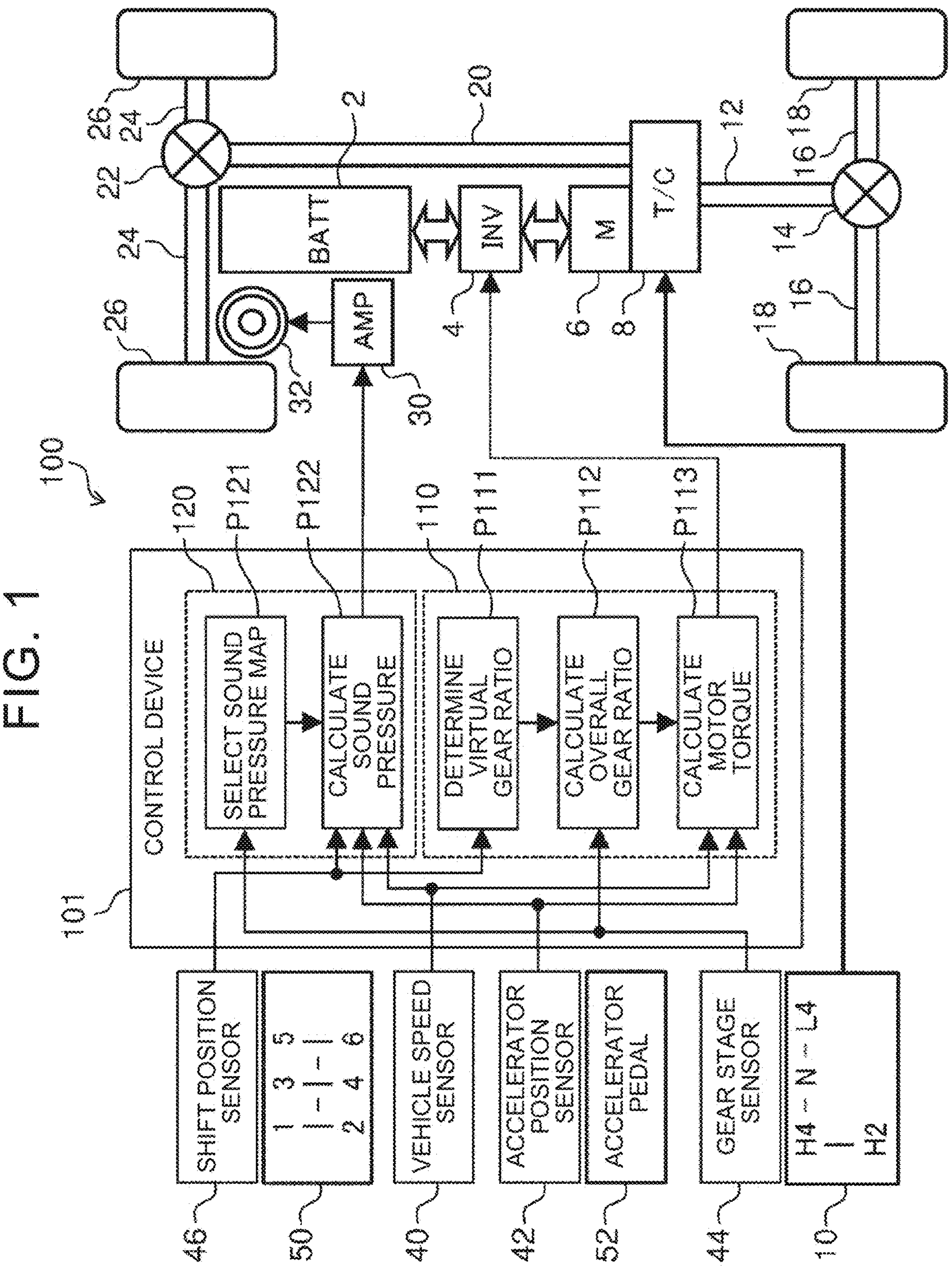
FIG. 1 shows the configuration of a vehicle according to a first embodiment of the present disclosure.

FIG. 1 schematically shows the configuration of a vehicle 100 according to a first embodiment. First, the configuration of a power system of the vehicle 100 will be described with reference to FIG. 1.

The vehicle 100 includes an electric motor (M) 6 as a traction power source. The vehicle 100 further includes a battery (BATT) 2 and an inverter (INV) 4. The battery 2 stores electrical energy for driving the electric motor 6. That is, the vehicle 100 is a battery electric vehicle (BEV) that runs on the electrical energy stored in the battery 2. The electric motor 6 is, for example, a three-phase alternating current (AC) motor. The inverter 4 is, for example, a voltage inverter, and controls the torque of the electric motor 6 by pulse width modulation (PWM) control.

The vehicle 100 includes a transfer case (T/C) 8. An output shaft of the electric motor 6 is connected to the transfer case 8. The transfer case 8 is connected to a rear differential gear 14 by a rear propeller shaft 12. The rear differential gear 14 is connected to right and left rear wheels 18 by right and left rear drive shafts 16. The transfer case 8 is connected to a front differential gear 22 by a front propeller shaft 20. The front differential gear 22 is connected to right and left front wheels 26 by right and left front drive shafts 24.

The transfer case 8 is a device that switches between two-wheel drive and four-wheel drive. The transfer case 8 is coupled to a shift device 10 mounted in a vehicle cabin. The shift device 10 includes a lever, not shown. Switching between two-wheel drive and four-wheel drive is mechanically performed by a driver operating the lever of the shift device 10. When four-wheel drive is selected, the driving force of the electric motor 6 is distributed to the rear propeller shaft 12 and the front propeller shaft 20 in the transfer case 8, so that the driving force is transmitted to the rear wheels 18 and the front wheels 26. In this case, both the rear wheels 18 and the front wheels 26 are drive wheels. When two-wheel drive is selected, the front propeller shaft 20 is disconnected from a power transmission path in the transfer case 8, so that the driving force of the electric motor 6 is transmitted only to the rear wheels 18. In this case, only the rear wheels 18 are drive wheels.

The transfer case 8 includes a speed change mechanism that shifts between high gear and low gear. High gear is gear for normal use having a gear ratio for normal use, and low gear is gear for large driving force having a low-speed gear ratio greater than the gear ratio for normal use. Shifting between high gear and low gear can be performed when four-wheel drive is selected. High gear that is gear for normal use is used when two-wheel drive is selected. When four-wheel drive is selected, shifting between high gear and low gear is mechanically performed by the driver operating the lever of the shift device 10. By operating the lever of the shift device 10, the driver can switch between two-wheel drive in high gear and four-wheel drive in high gear, and between four-wheel drive in high gear and four-wheel drive in low gear via neutral.

1-2. Configuration of Control System of Vehicle

Next, the configuration of a control system of the vehicle 100 will be described with reference to FIG. 1.

The vehicle 100 includes a vehicle speed sensor 40. At least one of wheel speed sensors, not shown, mounted on the right and left front wheels 26 and the right and left rear wheels 18 is used as the vehicle speed sensor 40. The vehicle 100 also includes an accelerator position sensor 42. The accelerator position sensor 42 is mounted on an accelerator pedal 52, and outputs a signal indicating the amount of depression of the accelerator pedal 52, i.e., the accelerator operation amount.

The accelerator pedal 52 is a driving operation member used to drive the vehicle 100. Driving operation members include a brake pedal, not shown, in addition to the accelerator pedal 52. In addition to these driving operation members, the vehicle 100 includes pseudo shifting operation members that imitate operation members used to perform shifting operations of a manual transmission internal combustion engine vehicle. The pseudo shifting operation members include a pseudo shifter 50 described below.

The pseudo shifter 50 is a dummy different from a real shifter. The pseudo shifter 50 has a structure imitating a shifter of a conventional manual transmission internal combustion engine vehicle. For example, the pseudo shifter 50 may have a structure imitating a shift lever (shift stick) mounted on a console, or may have a structure imitating shift paddles attached to a steering wheel. The pseudo shifter 50 herein has a structure imitating a shift lever, and is movable between shift positions along an H-pattern gate. Since the vehicle 100 does not include an actual transmission, the shift positions of the pseudo shifter 50 are virtual shift positions. In the example shown in FIG. 1, the virtual shift positions are first, second, third, fourth, fifth, and sixth gears. In a conventional manual transmission internal combustion engine vehicle, first gear is the shift position with the greatest gear ratio, followed by second gear, third gear, fourth gear, fifth gear, and sixth gear in descending order.

The vehicle 100 includes a shift position sensor 46. The shift position sensor 46 is mounted on the pseudo shifter 50 and outputs a signal indicating a virtual shift position selected by the pseudo shifter 50. The vehicle 100 also includes a gear stage sensor 44. The gear stage sensor 44 is mounted on the shift device 10 and outputs a signal indicating a gear stage of the transfer case 8 selected by operating the lever. Hereinafter, the gear stage that implements two-wheel drive at high gear will be referred to as "two-wheel drive high gear" and denoted by H2. The gear stage that implements four-wheel drive at high gear will be referred to as "four-wheel drive high gear" and denoted by H4. The gear stage that implements four-wheel drive at low gear will be referred to as "four-wheel drive low gear" and denoted by L4. Neutral will be denoted by N.

The vehicle 100 includes a control device 101. Sensors and devices to be controlled that are mounted on the vehicle 100 are connected to the control device 101 via an in-vehicle network. The vehicle speed sensor 40, the accelerator position sensor 42, the gear stage sensor 44, and the shift position sensor 46 are an example of the sensors mounted on the vehicle 100. The control device 101 is typically an electronic control unit (ECU). The control device 101 may be a combination of a plurality of ECUs. The control device 101 includes an interface, a memory, and a processor, which are not shown. The in-vehicle network is connected to the interface. The memory includes a random access memory (RAM) for temporarily recording data and a read-only memory (ROM) for storing programs that are executable by the processor and various types of data related to the programs. Each program is composed of a plurality of instructions. The processor reads and executes the programs and the data from the memory and generates control signals based on signals acquired from the sensors. The control device 101 may include one processor or may include a plurality of processors. The one or more processors constitute a circuit.

The control device 101 includes a motor control device 110 and a sound control device 120. Specifically, the processor functions at least as the motor control device 110 and the sound control device 120 by executing the programs stored in the memory. The processor functioning as the motor control device 110 and the processor functioning as the sound control device 120 may be different processors or may be the same processor.

1-3. Motor Control

An object to be controlled by the motor control device 110 is the inverter 4. The virtual shift position of the pseudo shifter 50 obtained from a signal from the shift position sensor 46 is input to the motor control device 110. The motor control device 110 performs a process P111 based on the virtual shift position. In the process P111, a virtual gear ratio of the vehicle 100 is determined using a vehicle model, described later, that models a manual transmission internal combustion engine vehicle. The virtual gear ratio is a gear ratio of a transmission that is virtually implemented by torque control of the electric motor 6 using the vehicle model.

The gear stage of the transfer case 8 obtained from a signal from the gear stage sensor 44 is input to the motor control device 110. The motor control device 110 performs a process P112 based on the gear stage of the transfer case 8 and the virtual gear ratio determined in the process P111. In the process P112, an overall gear ratio from the electric motor 6 to the transfer case 8 is calculated. The overall gear ratio is a gear ratio obtained by multiplying the gear ratio of the transfer case 8 determined by the gear stage by the virtual gear ratio.

The vehicle speed obtained from a signal from the vehicle speed sensor 40 and the accelerator operation amount obtained from a signal from the accelerator position sensor 42 are also input to the motor control device 110. The motor control device 110 performs a process P113 based on the vehicle speed, the accelerator operation amount, and the overall gear ratio calculated in the process P112. In the process P113, torque to be generated by the electric motor 6 is calculated using the vehicle model. The motor control device 110 inputs the vehicle speed, the accelerator operation amount, and the overall gear ratio to the vehicle model, and controls the inverter 4 so as to cause the electric motor 6 to generate the torque obtained using the vehicle model.

Figure 2:
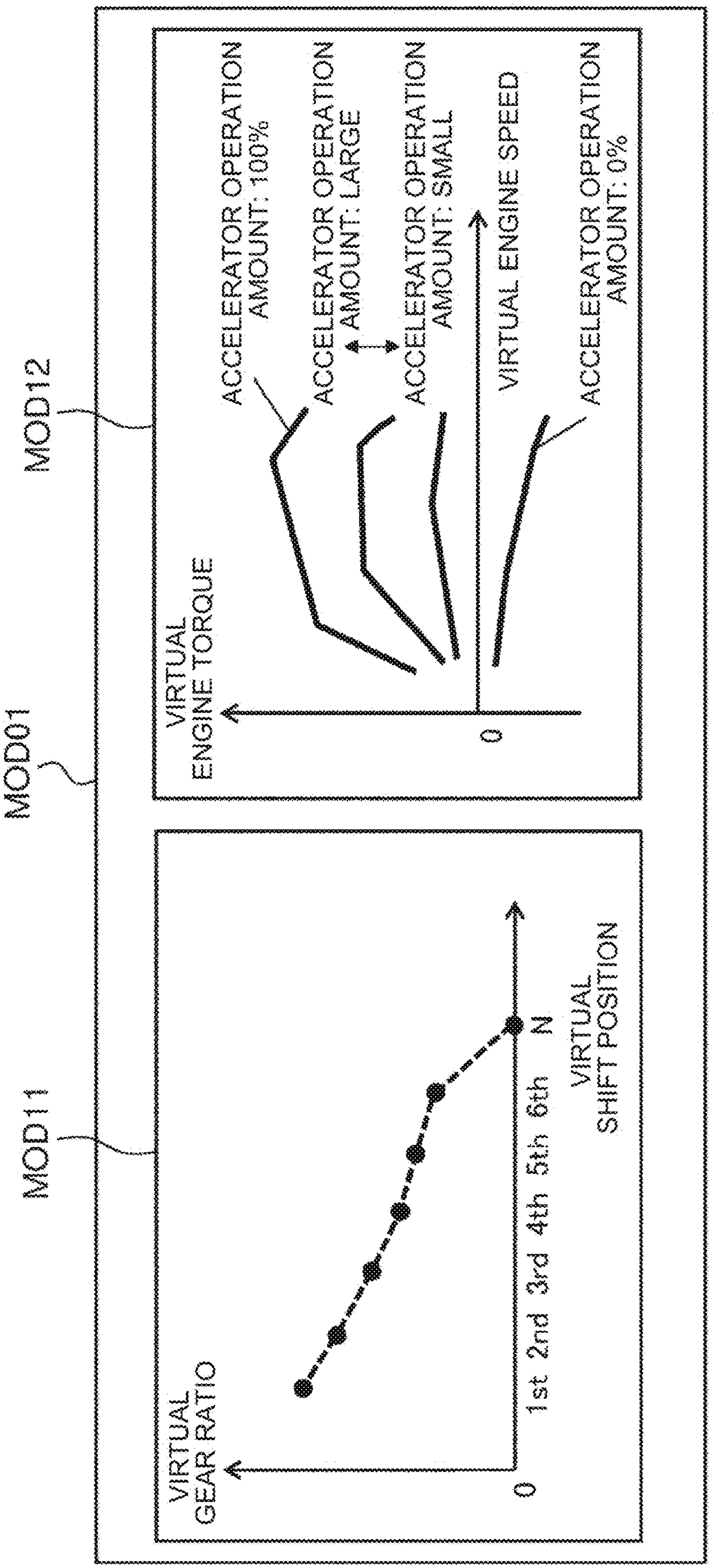
FIG. 2 shows an example of a vehicle model according to the first embodiment of the present disclosure.

The vehicle model used by the motor control device 110 will be described with reference to FIG. 2. As shown in FIG. 2, a vehicle model MOD01 is composed of a transmission model MOD11 and an engine model MOD12. An engine virtually implemented by the vehicle model MOD01 will be referred to as "virtual engine," and a transmission virtually implemented by the vehicle model MOD01 will be referred to as "virtual transmission." The transmission model MOD11 models the virtual transmission. The engine model MOD12 models the virtual engine.

The transmission model MOD11 calculates a virtual gear ratio. The virtual gear ratio is a gear ratio determined by the virtual shift position of the virtual transmission. The virtual gear ratio is set for each virtual shift position. The greatest virtual gear ratio is set for first gear, followed by second gear, third gear, fourth gear, fifth gear, and sixth gear in descending order. The transmission model MOD11 calculates virtual transmission torque using the virtual gear ratio and virtual engine torque described below. The virtual transmission torque is virtual torque output from the virtual transmission. The motor control device 110 controls the inverter 4 so as to change the output torque of the electric motor 6 according to the virtual transmission torque. The virtual transmission torque changes discontinuously in response to a change in virtual gear ratio. Such a discontinuous change in virtual transmission torque causes torque shock in the vehicle 100, creating a feel of a vehicle with a stepped transmission.

The engine model MOD12 calculates a virtual engine speed and virtual engine torque. The virtual engine speed is calculated from the vehicle speed and the overall gear ratio. The virtual engine torque is calculated from the virtual engine speed and the accelerator operation amount. In the engine model MOD12, the relationship between the virtual engine speed and the virtual engine torque is defined for each accelerator operation amount. Torque characteristics of the engine model MOD12 may be set to characteristics assumed for a gasoline engine, or may be set to characteristics assumed for a diesel engine. Alternatively, the torque characteristics of the engine model MOD12 may be set to characteristics assumed for a naturally aspirated engine, or may be set to characteristics assumed for a supercharged engine.

Figure 3:
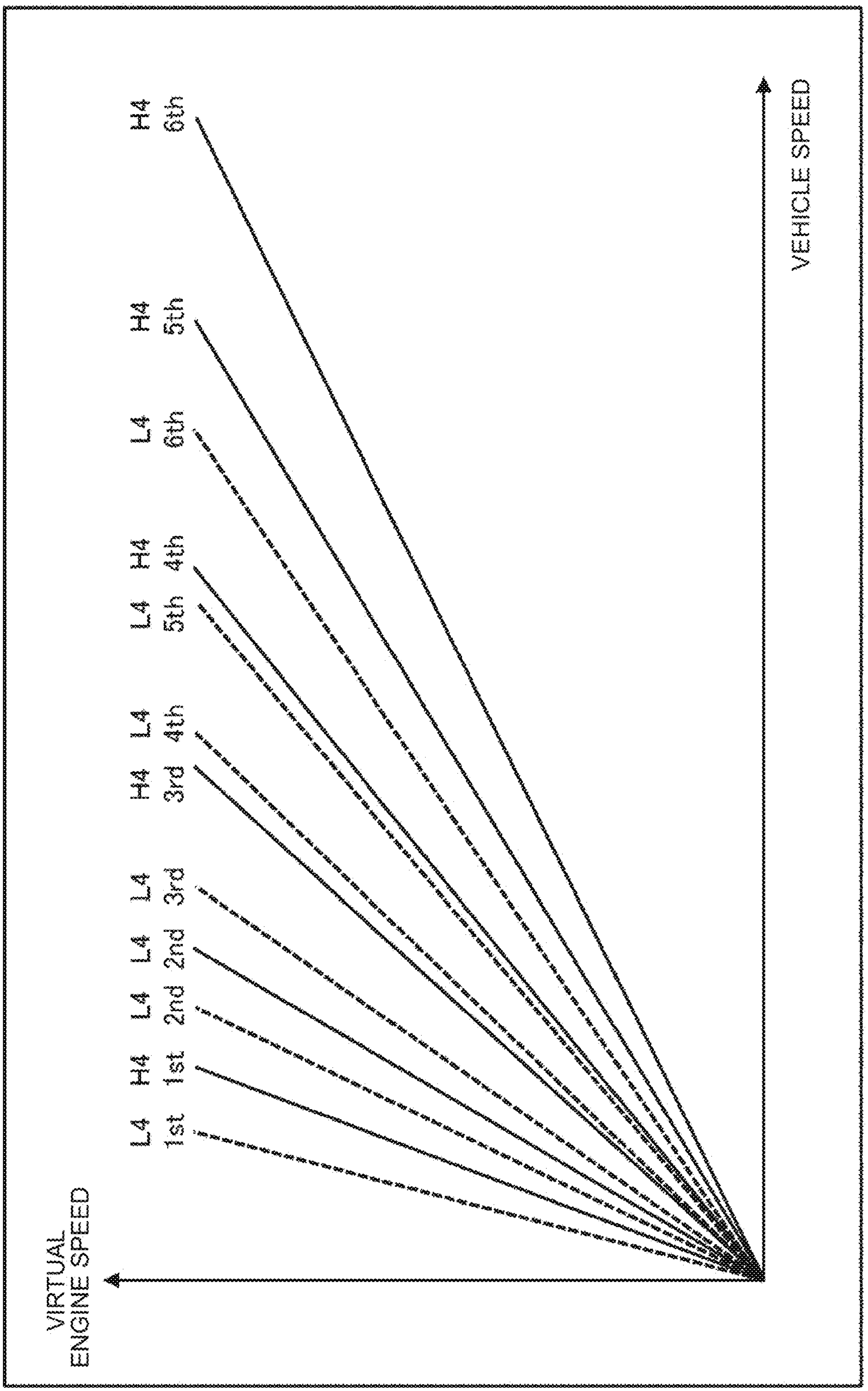
FIG. 3 shows an example of settings of an overall gear ratio determined by a virtual gear ratio and an actual gear ratio of a manual transmission.

FIG. 3 shows an example of settings of the overall gear ratio determined by the virtual gear ratio of the virtual transmission and the actual gear ratio of the transfer case 8. The slope of each line shown in the graph of FIG. 3 corresponds to the overall gear ratio. While the actual gear ratio of the transfer case 8 is determined mechanically, setting of the virtual gear ratio of the virtual transmission can be changed as desired by software. The virtual shift positions are assigned different virtual gear ratios. This makes it possible to implement various gear ratio combinations between the virtual transmission and the transfer case 8. In the example shown in FIG. 3, the virtual gear ratios are set so that none of the combinations of the virtual gear ratio and the actual gear ratio of the transfer case 8 have the same overall gear ratio. Such settings allow the driver to enjoy driving at different gear ratios in all combinations of the shift positions of the pseudo shifter 50 and the gear stages of the transfer case 8.

Figure 4:
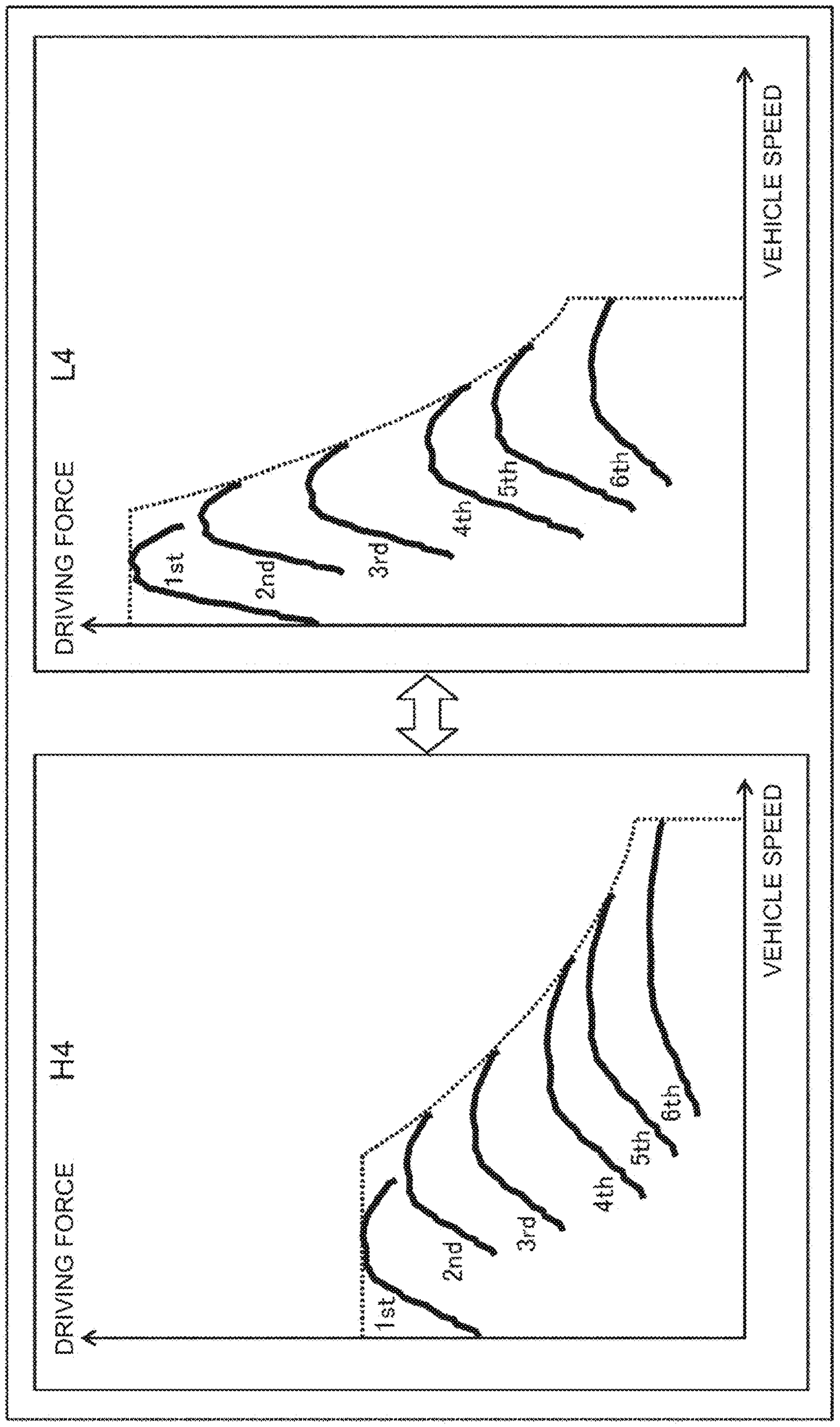
FIG. 4 shows driving force characteristics in four-wheel drive high gear and driving force characteristics in four-wheel drive low gear.

FIG. 4 shows driving force characteristics when H4 is selected and driving force characteristics when L4 is selected. Since the transfer case 8 is a real transmission, switching from H4 to L4 reduces a maximum speed, but can cause the vehicle 100 to generate a large driving force that cannot be obtained at the gear ratio for normal use in all the shift positions of the pseudo shifter 50. Therefore, the driver can enjoy driving on local roads and expressways by using H4 that can cover low to high speed ranges, and can also enjoying driving off-road and on steep uphill roads by using L4 that causes a large driving force.

1-4. Sound Control

Referring back to FIG. 1, sound control by the sound control device 120 will be described. An object to be controlled by the sound control device 120 is an amplifier 30. The amplifier 30 changes the sound pressure of a speaker

32 installed in the cabin of the vehicle 100. An artificially generated sound is output from the speaker 32. The sound control device 120 can generate various sounds. One of such artificial sounds is a pseudo engine sound that imitates an engine sound of a conventional engine vehicle. The sound control device 120 controls the amplifier 30 to change the sound pressure of the pseudo engine sound output from the speaker 32. The sound control device 120 together with the speaker 32 and the amplifier 30 constitutes a sound generator.

The gear stage of the transfer case 8 obtained from a signal from the gear stage sensor 44 is input to the sound control device 120. The sound control device 120 performs a process P121 based on the gear stage. In the process P121, a sound pressure map to be used to control the amplifier 30 is selected. The sound pressure map includes a low gear map that is selected when the gear stage is LA, and a high gear map that is selected when the gear stage is H4 and when the gear stage is H2. The sound control device 120 selects a sound pressure map according to the current gear stage of the transfer case 8.

The virtual shift position of the pseudo shifter 50 obtained from a signal from the shift position sensor 46, the vehicle speed obtained from a signal from the vehicle speed sensor 40, and the accelerator operation amount obtained from a signal from the accelerator position sensor 42 are also input to the sound control device 120. The sound control device 120 performs a process P122 based on the virtual shift position, the vehicle speed, and the accelerator operation amount by using the sound pressure map selected in the process P121. In the process P122, a sound pressure according to the virtual shift position, the vehicle speed, and the accelerator operation amount is calculated using the sound pressure map. The sound control device 120 controls the amplifier 30 so as to implement the sound pressure calculated in the process P122.

Figure 5:
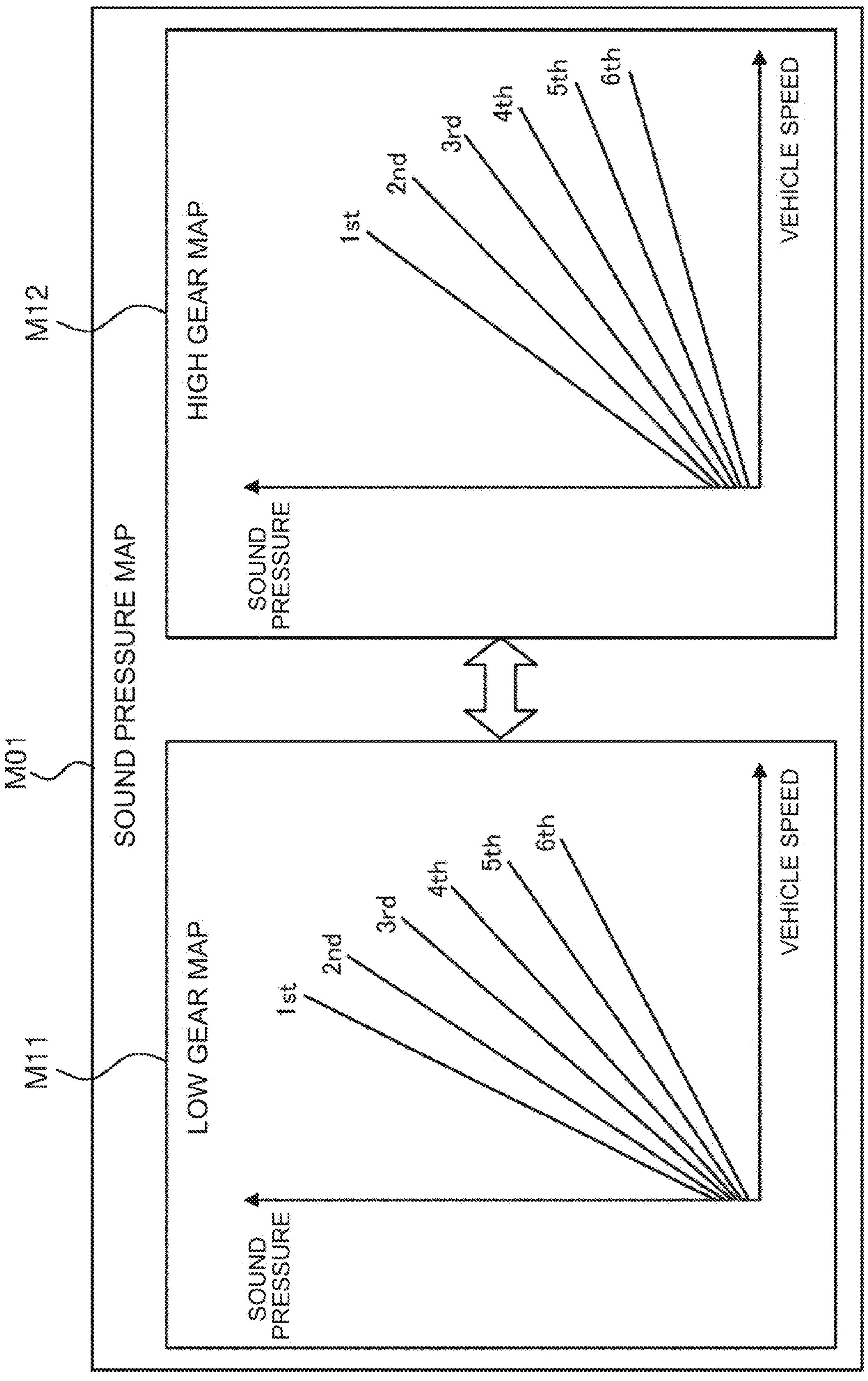
FIG. 5 shows an example of a sound pressure map according to the first embodiment of the present disclosure.

FIG. 5 shows an example of the sound pressure map according to the first embodiment. In a sound pressure map M01, sound pressure data is set with respect to the vehicle speed so that the sound pressure increases as the vehicle speed increases. The sound pressure data is also set with respect to the virtual shift position so that the sound pressure increases as the virtual gear ratio increases. The difference between a low gear map M11 and a high gear map M12 is the magnitude of the sound pressure for the same vehicle speed. The maps M11, M12 are created so that, for the same vehicle speed and the same virtual shift position, the sound pressure in the low gear map M11 is higher than the sound pressure in the high gear map M12. In the process P122, the sound pressure is calculated from the vehicle speed using the sound pressure map selected from the low gear map M11 and the high gear map M12 in the process P121.

1-5. Modifications

Next, modifications of the vehicle according to the present embodiment will be described. In a modification, the amplifier 30 shown in FIG. 1 is replaced with a frequency modulation circuit (FMC). An object to be controlled by the sound control device in the modification is the frequency modulation circuit. The frequency modulation circuit changes the frequency of the pseudo engine sound output from the speaker 32. The sound control device controls the frequency modulation circuit to change the frequency of the pseudo engine sound output from the speaker 32. The sound control device controls the frequency modulation circuit by using a frequency map. The frequency map is created so that, for the same vehicle speed, the frequency calculated using a low gear map is higher than the frequency calculated using a high gear map. In the modification, the sound control device together with the speaker and the frequency modulation circuit constitutes a sound generator.

As a modification of the power system, a transmission that allows the driver to manually switch between three or more shift positions may be provided instead of the transfer case 8. The transmission may a manual transmission that allows the driver to operate the clutch, a semi-automatic transmission that allows a machine to operate the clutch instead of the driver, a dual clutch transmission, or a continuously variable transmission, as long as the transmission allows manual operation by the driver. Any transmission can be used as long as the driver can manually switch at least between the gear ratio for normal use and the low-speed gear ratio for obtaining a large driving force.

2. Second Embodiment

2-1. Configuration of Control System of Vehicle

Figure 6:
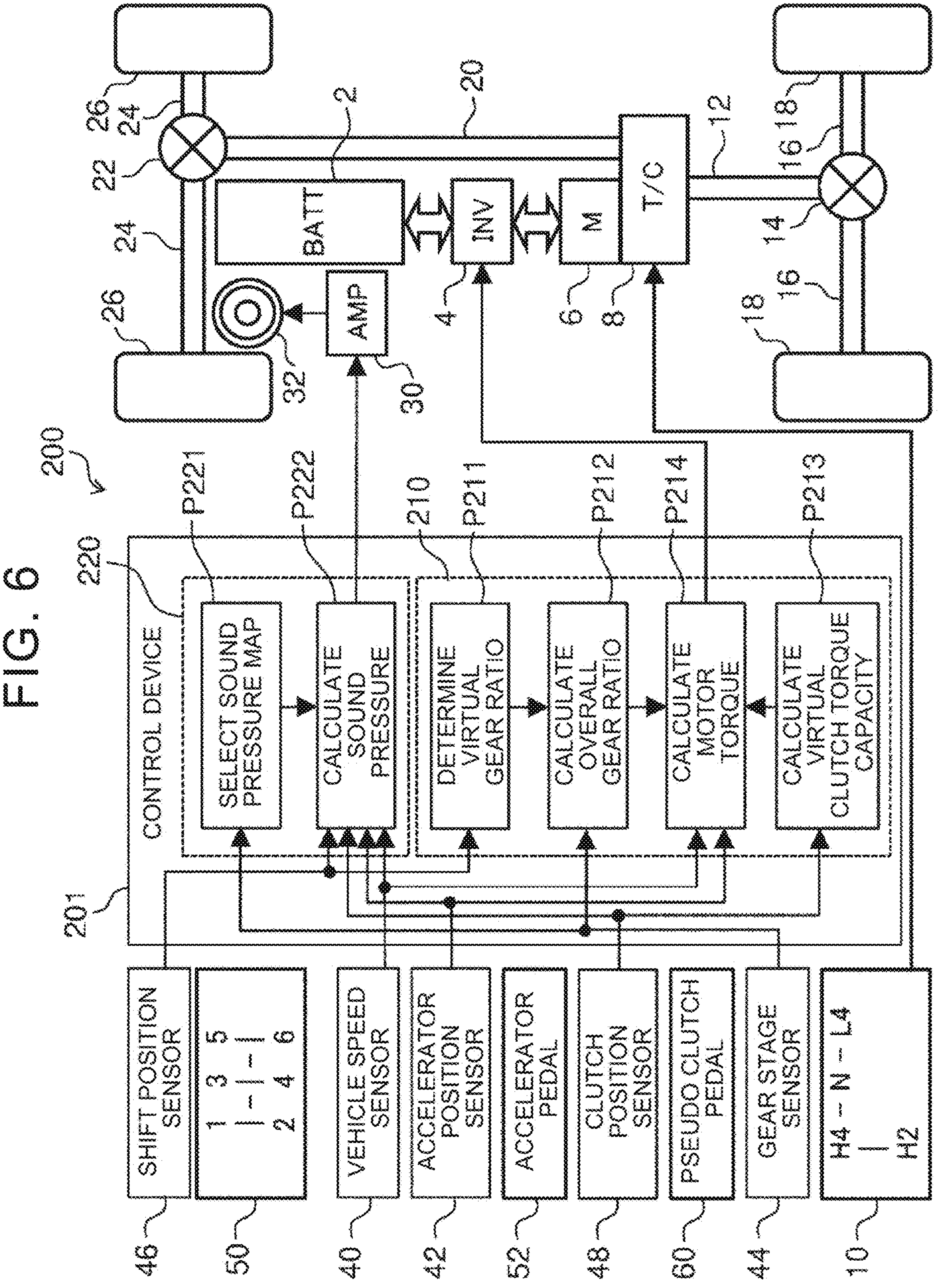
FIG. 6 shows the configuration of a vehicle according to a second embodiment of the present disclosure.

FIG. 6 schematically shows the configuration of a vehicle 200 according to a second embodiment. Of the components of the vehicle 200 shown in FIG. 6, those having the same functions as those of the components of the vehicle 100 according to the first embodiment are denoted by the same signs. Since the configuration of a power system of the vehicle 200 is the same as that of the power system of the vehicle 100 according to the first embodiment, description thereof will be omitted, and the configuration of a control system of the vehicle 200 will be described.

The vehicle 200 further includes a pseudo clutch pedal 60 in addition to the configuration of the vehicle 100 according to the first embodiment. Like the pseudo shifter 50, the pseudo clutch pedal 60 is also a pseudo shifting operation member that imitates an operation member used to perform shifting operations of a manual transmission internal combustion engine vehicle.

The pseudo clutch pedal 60 is a dummy that is different from a real clutch pedal. The pseudo clutch pedal 60 has a structure imitating a clutch pedal of a conventional manual transmission internal combustion engine vehicle. For example, the pseudo clutch pedal 60 includes a reaction force mechanism that generates a reaction force in response to depression of the pseudo clutch pedal 60 by the driver. A start position of the pseudo clutch pedal 60 is a position when no depressing force is applied to the pseudo clutch pedal 60, and an end position of the pseudo clutch pedal 60 is a position when the pseudo clutch pedal 60 is depressed all the way down. The driver can operate the pseudo clutch pedal 60 from the start position to the end position against the reaction force from the reaction force mechanism.

Although the pseudo clutch pedal 60 is a pedal-type operation device that is operated by foot, a lever-type or dial-type operation device that is operated by hand may be provided as a pseudo clutch operation device. The pseudo clutch operation device may have various structures as long as the driver can operate the pseudo clutch operation device from its start position to its end position against the reaction force and can experience an operation feel like a clutch pedal of a conventional manual transmission internal combustion engine vehicle with his or her foot or hand.

The vehicle 200 includes a clutch position sensor 48. The clutch position sensor 48 is mounted on the pseudo clutch pedal 60, and outputs a signal indicating the amount of depression of the pseudo clutch pedal 60. Since the vehicle 200 does not include an actual clutch, the amount of operation of the pseudo clutch pedal 60, that is, the clutch operation amount, is a virtual clutch operation amount. The vehicle 200 includes the vehicle speed sensor 40, the accelerator position sensor 42, the gear stage sensor 44, and the shift position sensor 46. In addition to these sensors, many other sensors are mounted on the vehicle 200.

The vehicle 200 includes a control device 201. Sensors and devices to be controlled that are mounted on the vehicle 200 are connected to the control device 201 via an in-vehicle network. Like the control device 101 according to the first embodiment, the control device 201 is typically an electronic control unit, and includes an interface, a memory, and a processor, which are not shown. The control device 201 may include one processor or may include a plurality of processors. The one or more processors constitute a circuit.

The control device 201 includes a motor control device 210 and a sound control device 220. Specifically, the processor functions at least as the motor control device 210 and the sound control device 220 by executing programs stored in the memory. The processor functioning as the motor control device 210 and the processor functioning as the sound control device 220 may be different processors, or may be the same processor.

2-2. Motor Control

An object to be controlled by the motor control device 210 is the inverter 4. The virtual shift position of the pseudo shifter 50 obtained from a signal from the shift position sensor 46 and the gear stage of the transfer case 8 obtained from a signal from the gear stage sensor 44 are input to the motor control device 210. The motor control device 210 performs a process P211 based on the virtual shift position. In the process P211, a virtual gear ratio of the vehicle 200 is determined using a vehicle model, described later, that models a manual transmission internal combustion engine vehicle. The motor control device 210 then performs a process P212 based on the gear stage of the transfer case 8 and the virtual gear ratio determined in the process P211. In the process P212, an overall gear ratio is calculated by multiplying the gear ratio of the transfer case 8 determined by the gear stage by the virtual gear ratio.

The virtual clutch operation amount of the pseudo clutch pedal 60 obtained from a signal from the clutch position sensor 48 is input to the motor control device 210. The motor control device 210 performs a process P213 based on the virtual clutch operation amount. In the process P213, a virtual clutch torque capacity is calculated using the vehicle model.

The vehicle speed obtained from a signal from the vehicle speed sensor 40 and the accelerator operation amount obtained from a signal from the accelerator position sensor 42 are also input to the motor control device 210. The motor control device 210 performs a process P214 based on the vehicle speed, the accelerator operation amount, the overall gear ratio calculated in the process P212, and the virtual clutch torque capacity calculated in the process P213. In the process P214, torque to be generated by the electric motor 6 is calculated from the vehicle speed, the accelerator operation amount, the overall gear ratio, and the virtual clutch torque capacity by using the vehicle model. The motor control device 210 controls the inverter 4 so as to cause the electric motor 6 to generate the torque obtained using the vehicle model.

Figure 7:
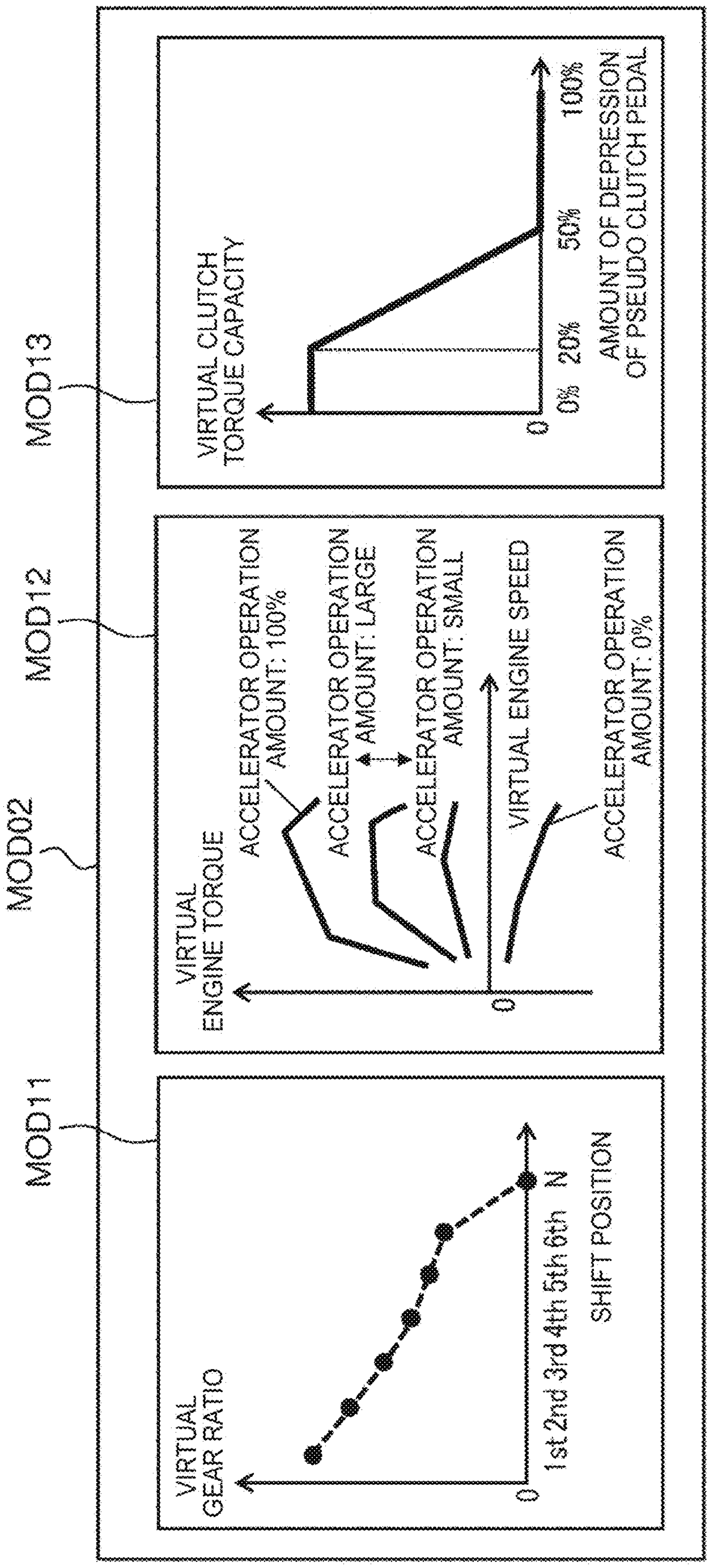
FIG. 7 shows an example of a vehicle model according to the second embodiment of the present disclosure.

The vehicle model used by the motor control device 210 will be described with reference to FIG. 7. As shown in FIG. 7, a vehicle model MOD02 is composed of a transmission model MOD11, an engine model MOD12, and a clutch model MOD13. A clutch virtually implemented by the vehicle model MOD02 will be referred to as "virtual clutch." The clutch model MOD13 models the virtual clutch. The content of the transmission model MOD11 and engine model MOD12 is the same as that of the transmission model MOD11 and engine model MOD12 of the vehicle model MOD01 according to the first embodiment.

The clutch model MOD13 calculates a virtual clutch torque capacity. The virtual clutch torque capacity means the clutch torque capacity of the virtual clutch. The clutch model MOD13 outputs the virtual clutch torque capacity with respect to the amount of depression of the pseudo clutch pedal 60. The amount of depression of the pseudo clutch pedal 60 is 0% at the start position of the pseudo clutch pedal 60, and is 100% at the end position of the pseudo clutch pedal 60. In the example shown in FIG. 7, the virtual clutch torque capacity has a maximum value when the amount of depression is in the range of 0% to 20%. When the amount of depression is between 20% and 50%, the virtual clutch torque capacity decreases as the amount of depression increases. The virtual clutch torque capacity is zero when the amount of depression is in the range of 50% to 100%. In the clutch model MOD13, virtual clutch torque that is input from the virtual clutch to the virtual transmission is calculated based on a comparison between the virtual clutch torque capacity and the virtual engine torque calculated by the engine model MOD12. In the present embodiment, the transmission model MOD11 calculates virtual transmission torque using the virtual gear ratio and the virtual clutch torque.

2-3. Sound Control

Referring back to FIG. 6, sound control by the sound control device 220 will be described. An object to be controlled by the sound control device 220 is the amplifier 30. The sound control device 220 controls the amplifier 30 to change the sound pressure of the pseudo engine sound output from the speaker 32. The sound control device 220 together with the speaker 32 and the amplifier 30 constitutes a sound generator.

The gear stage of the transfer case 8 obtained from a signal from the gear stage sensor 44 is input to the sound control device 220. The sound control device 220 performs a process P221 based on the gear stage. In the process P221, a sound pressure map to be used to control the amplifier 30 is selected. The sound pressure map used in process P221 is the same as the sound pressure map M01 according to the first embodiment. The sound control device 220 selects a sound pressure map according to the current gear stage of the transfer case 8 from the low gear map M11 and the high gear map M12.

The virtual shift position of the pseudo shifter 50 obtained from a signal from the shift position sensor 46, the vehicle speed obtained from a signal from the vehicle speed sensor 40, the accelerator operation amount obtained from a signal from the accelerator position sensor 42, and the amount of depression of the pseudo clutch pedal 60 obtained from a signal from the clutch position sensor 48 are also input to the sound control device 220. The sound control device 220 performs a process P222 using the sound pressure map selected in the process P221 and a sound pressure correction factor map described later. In the process P222, a sound pressure according to the virtual shift position, the vehicle speed, and the accelerator operation amount is calculated using the sound pressure map. A sound pressure correction factor according to the amount of depression of the pseudo clutch pedal 60 is calculated using the sound pressure correction factor map. In the process P222, the sound pressure is corrected by multiplying the sound pressure by the sound pressure correction factor. The sound control device 220 controls the amplifier 30 so as to implement the sound pressure corrected by the sound pressure correction factor.

Figure 8:
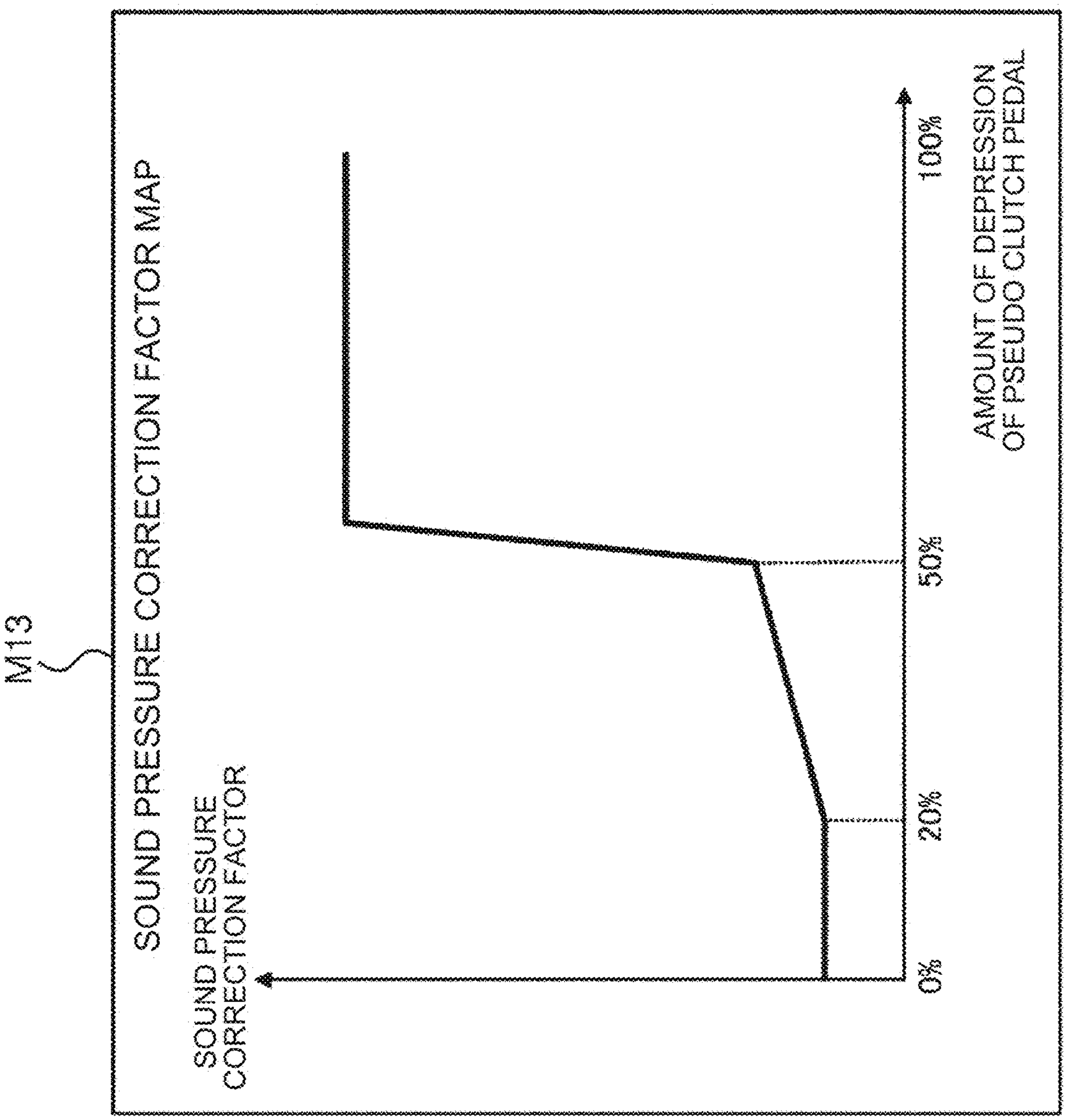
FIG. 8 shows an example of a sound pressure correction factor map according to the second embodiment of the present disclosure.

FIG. 8 shows an example of the sound pressure correction factor map according to the second embodiment. In a sound pressure correction factor map M13, the sound pressure correction factor is set with respect to the amount of depression of the pseudo clutch pedal 60 so that the sound pressure correction factor increases as the amount of depression of the pseudo clutch pedal 60 increases. In the clutch model MOD13 described above, the virtual clutch torque capacity decreases as the amount of depression of the pseudo clutch pedal 60 increases. In a specific example, if the pseudo clutch pedal 60 is depressed in a situation where the vehicle 200 is traveling at a constant speed in balance with vehicle running resistance, the virtual clutch torque capacity starts to become insufficient for the virtual engine torque when the amount of depression reaches about 20%. The virtual clutch is half-engaged until the amount of depression reaches about 50%, and is disengaged when the pseudo clutch pedal 60 is further depressed. As the virtual clutch thus changes from the engaged state to the half-engaged state and then to the disengaged state, the virtual engine speed increases and the sound pressure of the pseudo engine sound output from the speaker 32 increases.

2-4. Modifications

The modifications of the first embodiment are also applicable to the second embodiment. That is, in FIG. 6, the amplifier 30 may be replaced with a frequency modulation circuit, and the sound control device 220 may be replaced with a control device for the frequency modulation circuit. The sound pressure map may be replaced with a frequency map, and the sound pressure correction factor map may be replaced with a frequency correction factor map. In the frequency correction factor map, a frequency correction factor is set with respect to the amount of depression of the pseudo clutch pedal 60 so that the frequency correction factor increases as the amount of depression of the pseudo clutch pedal 60 increases.

What is claimed is:

1. A battery electric vehicle comprising:

an electric motor configured to serve as a driving source for the battery electric vehicle;

a driving operation member configured to be used to drive the battery electric vehicle;

a pseudo shifting operation member that imitates an operation member configured to be used to perform a shifting operation of a manual transmission internal combustion engine vehicle;

a transmission mechanically coupled between the electric motor and a drive wheel and configured to allow a driver to manually switch between a gear ratio for normal use and a low-speed gear ratio; and a control device configured to control a motion of the battery electric vehicle in response to an operation of the driving operation member according to an operation state of the pseudo shifting operation member and a gear ratio selected by the transmission.

2. The battery electric vehicle according to claim 1, wherein the transmission is a transfer case configured to select from four-wheel drive low gear, four-wheel drive high gear, and two-wheel drive high gear.

3. The battery electric vehicle according to claim 1, wherein:

the driving operation member includes an accelerator pedal;

the pseudo shifting operation member includes a pseudo shifter imitating a shifter of a manual transmission; and the control device is configured to change torque of the electric motor according to an amount of operation of the accelerator pedal, a shift position selected by operating the pseudo shifter, and the gear ratio selected by the transmission.

4. The battery electric vehicle according to claim 1, wherein:

the driving operation member includes an accelerator pedal;

the pseudo shifting operation member includes a pseudo shifter imitating a shifter of a manual transmission, and a pseudo clutch operation device imitating a clutch operation device; and the control device is configured to change torque of the electric motor according to an amount of operation of the accelerator pedal, a shift position selected by operating the pseudo shifter, an amount of operation of the pseudo clutch operation device, and the gear ratio selected by the transmission.

5. The battery electric vehicle according to claim 3, wherein:

the pseudo shifter is configured to select from a plurality of shift positions;

the shift positions are assigned different virtual gear ratios; and the virtual gear ratios are set in such a manner that none of combinations of the virtual gear ratio and the gear ratio selected by the transmission have a same overall gear ratio, the overall gear ratio being obtained by multiplying the virtual gear ratio by the gear ratio of the transmission.

6. The battery electric vehicle according to claim 4, further comprising a sound generator configured to artificially generate a sound in a vehicle cabin, wherein the sound generator is configured to perform either or both of the following: increasing a sound pressure of the sound as the amount of operation of the pseudo clutch operation device increases, and increasing a frequency of the sound as the amount of operation of the pseudo clutch operation device increases.

* * * * *